United States Patent
Jogand-Coulomb et al.

(10) Patent No.: US 9,076,484 B2
(45) Date of Patent: Jul. 7, 2015

(54) METHODS FOR ESTIMATING PLAYBACK TIME AND HANDLING A CUMULATIVE PLAYBACK TIME PERMISSION

(75) Inventors: Fabrice E. Jogand-Coulomb, San Carlos, CA (US); Junzhi Wang, San Jose, CA (US); Keren Azari, Kfar-Vradim (IL); Aviad Zer, Kfar-Vradim (IL)

(73) Assignee: SanDisk Technologies Inc., Plano, TX (US)

( * ) Notice: Subject to any disclaimer, the term of this patent is extended or adjusted under 35 U.S.C. 154(b) by 1383 days.

(21) Appl. No.: 12/231,594

(22) Filed: Sep. 3, 2008

(65) Prior Publication Data

US 2010/0058484 A1     Mar. 4, 2010

(51) Int. Cl.
| G11B 20/00 | (2006.01) |
| G06F 21/10 | (2013.01) |
| H04H 60/16 | (2008.01) |
| H04H 60/80 | (2008.01) |
| H04N 21/4627 | (2011.01) |
| H04N 21/8355 | (2011.01) |
| H04L 9/32 | (2006.01) |

(52) U.S. Cl.
CPC .......... *G11B 20/00086* (2013.01); *G06F 21/10* (2013.01); *G11B 20/0021* (2013.01); *G11B 20/00731* (2013.01); *G11B 20/0084* (2013.01); *G11B 20/00869* (2013.01); *H04H 60/16* (2013.01); *H04H 60/80* (2013.01); *H04N 21/4627* (2013.01); *H04N 21/8355* (2013.01); *H04L 2209/603* (2013.01); *H04L 9/3271* (2013.01); *H04L 9/3297* (2013.01)

(58) Field of Classification Search
CPC .................................................. G11B 20/00086
See application file for complete search history.

(56) References Cited

U.S. PATENT DOCUMENTS

| 5,825,883 | A  * | 10/1998 | Archibald et al. | 705/53 |
| 7,096,504 | B1 * | 8/2006  | Tagawa et al.    | 726/27 |
| 7,802,095 | B2 * | 9/2010  | Risan et al.     | 713/164 |
| 7,844,835 | B2 * | 11/2010 | Ginter et al.    | 713/193 |
| 7,930,391 | B1 * | 4/2011  | Holt             | 709/224 |
| 8,090,458 | B2 * | 1/2012  | Kim              | 700/94 |

(Continued)

FOREIGN PATENT DOCUMENTS

EP     1182875 A2 *  2/2002

OTHER PUBLICATIONS

How Computers Work, Millennium Edition. White, Ron. Que Publishing, Indianapolis, 1999. ISBN 0-7897-2112-0. Chapters 1-9, 14-31 included.*

(Continued)

*Primary Examiner* — Jacob C. Coppola
(74) *Attorney, Agent, or Firm* — Brinks Gilson & Lione

(57) ABSTRACT

Methods for estimating playback time and handling a cumulative playback time permission are provided. In one embodiment, a file is streamed from a first device to a second device for playback. The amount of data of the file that was streamed to the second device is determined, and a playback time of the file is estimated using a time rate associated with the file and the determined amount of data of the file that was streamed to the second device. If the file is associated with a permission specifying an allowed cumulative playback time of the file, the estimated playback time can be accrued against the allowed cumulative playback time. Other embodiments are disclosed, and each of the embodiments described herein can be used alone or in combination with one another.

33 Claims, 6 Drawing Sheets

(56) References Cited

U.S. PATENT DOCUMENTS

| | | | |
|---|---|---|---|
| 8,135,852 B2* | 3/2012 | Nilsson et al. | 709/231 |
| 2003/0021198 A1* | 1/2003 | Millikan et al. | 369/47.3 |
| 2003/0126237 A1* | 7/2003 | Tsuchiya | 709/220 |
| 2003/0139980 A1* | 7/2003 | Hamilton | 705/27 |
| 2004/0010440 A1* | 1/2004 | Lenard et al. | 705/10 |
| 2004/0133622 A1* | 7/2004 | Clubb et al. | 709/200 |
| 2004/0153407 A1* | 8/2004 | Clubb et al. | 705/41 |
| 2004/0196972 A1* | 10/2004 | Zhu et al. | 380/45 |
| 2004/0236945 A1* | 11/2004 | Risan et al. | 713/165 |
| 2005/0015509 A1* | 1/2005 | Sitaraman | 709/231 |
| 2005/0066353 A1* | 3/2005 | Fransdonk | 725/29 |
| 2005/0114896 A1* | 5/2005 | Hug et al. | 725/88 |
| 2005/0276572 A1* | 12/2005 | Boswell et al. | 386/46 |
| 2006/0005258 A1* | 1/2006 | Hirose | 726/27 |
| 2006/0015937 A1* | 1/2006 | Illowsky et al. | 726/18 |
| 2006/0069926 A1* | 3/2006 | Ginter et al. | 713/194 |
| 2006/0109795 A1* | 5/2006 | Kamata et al. | 370/252 |
| 2006/0168291 A1* | 7/2006 | van Zoest et al. | 709/231 |
| 2006/0193524 A1* | 8/2006 | Tarumoto et al. | 382/232 |
| 2006/0248214 A1* | 11/2006 | Jackson et al. | 709/231 |
| 2007/0055743 A1* | 3/2007 | Pirtle et al. | 709/217 |
| 2007/0116435 A1* | 5/2007 | Kim | 386/96 |
| 2007/0174471 A1* | 7/2007 | Van Rossum | 709/229 |
| 2007/0180980 A1* | 8/2007 | Kim | 84/612 |
| 2007/0185815 A1* | 8/2007 | Boccon-Gibod et al. | 705/51 |
| 2007/0230898 A1* | 10/2007 | Shen et al. | 386/68 |
| 2008/0065552 A1* | 3/2008 | Elazar et al. | 705/59 |
| 2008/0065911 A1* | 3/2008 | Elazar et al. | 713/194 |
| 2008/0066150 A1* | 3/2008 | Lim | 726/1 |
| 2008/0077701 A1* | 3/2008 | Kongalath et al. | 709/232 |
| 2008/0095123 A1* | 4/2008 | Kuroda et al. | 370/336 |
| 2008/0172140 A1* | 7/2008 | Kim et al. | 700/94 |
| 2008/0235746 A1* | 9/2008 | Peters et al. | 725/111 |
| 2008/0243755 A1* | 10/2008 | Jogand-Coulomb | 707/1 |
| 2008/0244713 A1* | 10/2008 | Jogand-Coulomb | 726/5 |
| 2008/0273590 A1* | 11/2008 | Shostak | 375/240.01 |
| 2008/0320560 A1* | 12/2008 | Casey et al. | 726/3 |
| 2009/0122992 A1* | 5/2009 | Kordon et al. | 380/287 |
| 2009/0192929 A1* | 7/2009 | Hoeflinger et al. | 705/35 |
| 2009/0265789 A1* | 10/2009 | Risan et al. | 726/26 |
| 2010/0024000 A1* | 1/2010 | Holtzman et al. | 726/2 |
| 2010/0191613 A1* | 7/2010 | Raleigh | 705/26 |
| 2011/0058675 A1* | 3/2011 | Brueck et al. | 380/277 |
| 2011/0296046 A1* | 12/2011 | Arya et al. | 709/231 |

OTHER PUBLICATIONS

Internet Archive Wayback Machine, archive of "Data Rates and File Sizes." Archived Jul. 4, 2006. Available at <http://web.archive.org/web/20060704194149/http://neuron2.net/LVG/ratesandsizes.html>.*

"kbps ?" Posting to forums.ilounge.com. Jan. 13, 2005. Available at <http://forums.ilounge.com/digital-audio-formats/68487-calculating-file-size-bitrate.html>.*

"Multimedia Processing for Enhanced Information Delivery on Mobile Devices," Gibbon et al., 6 pages (Undated).

"System for Controlling Access to Digital Content," U.S. Appl. No. 11/694,868, Inventor: Fabrice Jogand-Coulomb, filed Mar. 30, 2007.

"Method for Controlling Access to Digital Content," U.S. Appl. No. 11/694,866, Inventor: Fabrice Jogand-Coulomb, filed Mar. 30, 2007.

* cited by examiner

METHODS FOR ESTIMATING PLAYBACK TIME AND HANDLING A CUMULATIVE PLAYBACK TIME PERMISSION

BACKGROUND

A digital rights management (DRM)-protected file is often associated with permissions regarding how the file can be used. One such permission specifies an allowed cumulative use (e.g., playback) time of the file. In operation, a rendering system informs a DRM system of the amount of time the file has been played, and the DRM system accrues that playback time against the allowed cumulative playback time. When the DRM system receives a subsequent request to play the file, the DRM system determines if the cumulative playback time permission is still valid, and, based on that determination, decides whether or not to allow the player to play the file.

Cumulative playback time permissions are typically used only with devices that have integrated DRM and rendering systems since the playback system needs to inform the DRM system of the amount of time a file has been played in order for the DRM system to accrue the playback time against the allowed cumulative playback time. As such, cumulative playback time permissions have not been used in environments where the DRM and rendering systems are distributed between two devices, such as when the DRM system is located on a memory device that stores a DRM-protected file, and the playback system is located on a host device.

SUMMARY

The concept(s) presented herein can be implemented in various embodiments, and this summary includes a number of exemplary embodiments.

By way of introduction, the embodiments described below provide methods for estimating playback time and handling a cumulative playback time permission. In one embodiment, a file is streamed from a first device to a second device for rendering. The amount of data of the file that was streamed to the second device is determined, and a playback time of the file is estimated using a time rate associated with the file and the determined amount of data of the file that was streamed to the second device. If the file is associated with a permission specifying an allowed cumulative playback time of the file, the estimated playback time can be accrued against the allowed cumulative playback time.

The time rate is used as a measure of the data transferred to the second device (as measured, for example, by counting the number of bits read from the first device or determining the logical block address (LBA) range read from the first device) with playback time information. The time rate can comprise an average bit rate of the file, an average bit rate of the file adjusted to account for non-content data in the file, or a ratio of a total playback time length of the file and a size of the file, for example. The time rate can also take in account the format of the data stream. When the time rate is not provided with the file meta data or with rights associated with the file, the time rate can be determined by a device in communication with the first device. In such a situation, the first device can provide the device with temporary access to the file to determine the time rate, which temporary access may or may not be accrued against the allowed cumulative playback time. Further, the file can be streamed in pieces or all at once to the second device for playback by repeatedly determining if the cumulative playback time permission is still valid and, if the cumulative playback time permission is still valid, allowing the second device temporary access to the file, which temporary access can be accrued against the allowed cumulative playback time.

In one embodiment, the file is a digital rights management (DRM)-protected file, and a DRM system in the first device performs the streaming, determining, estimating, and accruing acts described above (that exclude rendering). The first and second devices can take any suitable form. For example, the first device can be a memory device, and the second device can be a host device. As another example, the first device can be a personal computer, and the second device can be a network device.

Each of the embodiments described herein can be used alone or in combination with one another. Further, the methods described herein can be implemented in circuitry on a device, such as a memory device. Various embodiments will now be described with reference to the attached drawings.

DETAILED DESCRIPTION OF THE PRESENTLY PREFERRED EMBODIMENTS

The following embodiments are generally directed to methods for estimating playback time and handling a cumulative playback time permission. These embodiments can be used to address the problem described above in which a first device stores a file but a second device renders the file. In this situation, the first device can determine the amount of data of the file streamed to the second device for playback, but the first device does not know how that amount of data relates to playback time of the file. To address this situation, in one embodiment, a time rate associated with the file is provided to the first device, and the first device estimates the playback time of the file using the time rate and the amount of data of the file that was streamed to the second device. If the first device is also responsible for handling a cumulative playback time permission associated with the file, the first device can accrue the estimated playback time against the allowed cumulative playback time. One advantage of these embodiments is that they can be used to allow a cumulative playback time permission to be implemented on a device that has an on-board DRM system but lacks a playback system (i.e., in configurations where rendering and DRM systems are implemented on separate devices), instead of merely on devices that have integrated DRM and rendering systems. These embodiments will be described in more detail below.

Figure 1:
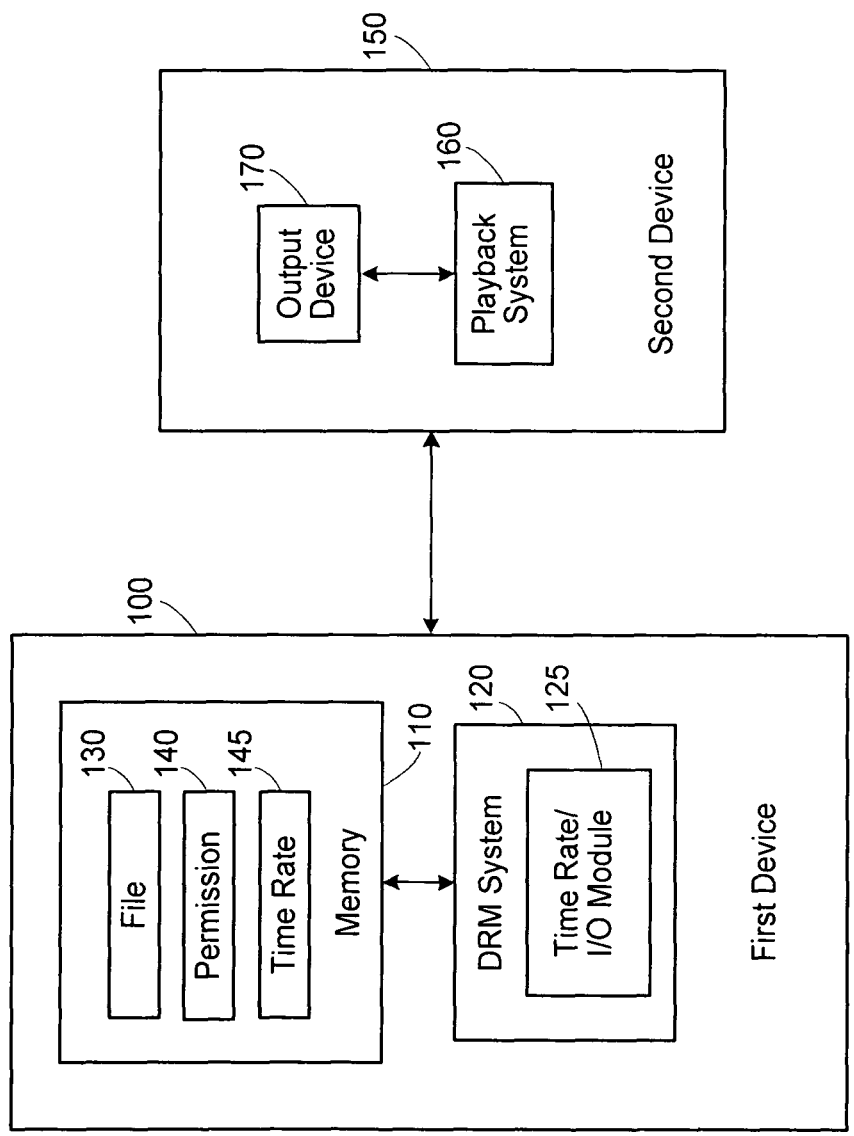
FIG. 1 is a block diagram of first and second devices of an embodiment.

Turning now to the drawings, FIG. 1 shows a first device 100 in communication with a second device 150. As shown in FIG. 1, the first and second devices 100, 150 are separate devices that are in communication with one another. As used herein, the phrase "in communication with" means in direct communication with or in indirect communication with via one or more components named or unnamed herein. In this embodiment, the first and second devices 100, 150 are separate devices that are in communication with each other via a wired or wireless connection. For example, the first and second devices 100, 150 can each comprise mating pins to establish an electrical and physical connection, or the first and second devices 100, 150 can each comprise wireless transceivers.

The first and second devices 100, 150 can take any suitable form. In one embodiment, the first device 100 takes the form of a memory device (e.g., a memory card, a SIM card, a-memory stick, or a USB device), and the second device 150 takes the form of a host device to the memory device (e.g., a mobile phone, a game device, a personal digital assistant (PDA), an email/text messaging device, a digital camera, a digital media/content player, a personal computer, a GPS navigation device, and a TV system). In another embodiment, the first device 100 takes the form of a personal computer, and the second device 150 takes the form of a network device, such as a video display networked to the personal computer. Other examples of first and second devices 100, 150 include, but are not limited to, a portable media player (PMP) connected to a TV or a PC. Further, instead of directly being connected, the first and second devices 100, 150 can be indirectly connected through another device. For example, when the first device 100 takes the form of a memory card and the second device 150 takes the form of a TV or PC, the memory can be connected to the TV or PC via a PMP.

As shown in FIG. 1, the first device 100 comprises a memory 110 and a digital rights management (DRM) system 120. The memory 110 can take any suitable form, such as, but not limited to, a non-volatile solid-state memory (e.g., flash memory), optical memory, and magnetic memory, and can be one-time programmable, few-time programmable, or many-time programmable. Also, although shown as one box in FIG. 1, the memory 110 can take the form of several components. It should be noted that the memory 110 does not necessarily need to store files (i.e., the files can be stored in a different memory of the first device 100 or, as noted below, even in a different device) and may merely be used by the DRM system 120 only. That is, the DRM system 120 can operate on its own and as a path through which to stream files. The DRM system 120 is implemented in circuitry in the first device 100 and is used to enforce DRM functions, as described below. (Some of these DRM functions can be supported by a time rate/I/O module 125, which provides time information.) As used herein, "circuitry" can take the form of one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. In one embodiment, the DRM system 120 is a function provided by a processor executing computer-readable program code stored in the memory 110 or another storage area of the first device 100. The circuitry can perform additional functions, and the first device 100 can contain other components, which are not shown in FIG. 1 to simplify the drawing.

As also shown in FIG. 1, the second device 150 comprises a playback system 160 and output device 170. The playback system 160 can take any suitable form (e.g., a processor executing computer-readable program code) and can be customized for playing back a particular file type (e.g., a music player) or can be a general player (e.g., a generic media player). The output device 170 can also take any suitable form, such as, but not limited to, a display device, a speaker, a headphone jack, a printer, etc. It should be noted that the terms "play" and "playback" are intended to generally refer to the operation of rendering the file in the appropriate form of output and are not necessarily limited to operations concerning audio and video files. For example, if a file is a text file, the file is "played" when the text is rendered on the output device 170 even though the text file does not have any audio or moving video components to be "played."

Turning back to FIG. 1, the memory 110 in the first device 100 stores a DRM-protected file 130, a permission 140 associated with the file 130, and a time rate 145 associated with the file 130. The file 130 can be stored anywhere in the first device 100 but is preferably read through a system controlled by the DRM system 120 when streamed. The file 130 can take any suitable form, such as, but not limited to, an audio file (e.g., a song, spoken word, a podcast, one or a series of sounds, etc.), a video file (with or without accompanying audio) (e.g., a movie, an episode of a TV show, a news program, etc.), an image file (e.g., a picture, a computer-generated display, etc.), a text file (with or without graphics) (e.g., a news article), a web file, a game file, and a hybrid multi-media file. As a file can take any suitable form, the claims should not be read as requiring a specific type of file unless explicitly recited therein. Further, as noted above, the file 130 can be stored in a device outside of the first device 100. In such an embodiment, the file 130 can be streamed from the external device to the first device 100 and then to the second device 150. In this way, the first device 100 acts as a "pass through" device, with the DRM system 120 estimating playback time and/or handling a cumulative playback time permission but not actually storing the file 130.

The permission 140 specifies how the file 130 can be used. In this particular embodiment, the permission 140 specifies an allowed cumulative playback time of the file 130. For example, if the file 130 is a song, the permission 140 can specify that the song can be played for a maximum of 10 minutes. As another example, if the file 130 is a video, the permission 140 can specify that the video can be watched for a maximum of two hours. It should be noted that the file 130 (and other files stored in the memory 110) can be associated with one or more additional permissions, such as, but not limited to, when the file 130 can be played, how many times the file 130 can be played, which users can play the file 130, etc. For simplicity, the following discussion will assume that the file 130 is only associated with the cumulative playback time permission 140. It should be noted that the terms "permissions" and "rights" may be used interchangeably herein. However, the term "rights" should not be confused with the term "rights object," which refers to an object that includes the permission (right) associated with a file, as well as additional elements, such as, but not limited to, a content encryption key used to decrypt the file.

In this embodiment, the DRM system 120 is responsible for handling the cumulative playback time permission 140. In operation, the DRM system 120 receives a request to play the file 130 and determines whether or not the permission 140 is still valid. If the permission 140 is still valid, the DRM system 120 allows playback of the file; otherwise, playback is denied. The DRM system 120 is also responsible for keeping the permission 140 up-to-date using a technique such as, but not limited to, accruing the playback time of the file 130 against the allowed cumulative playback time in the permission 140. The playback process of a presently preferred embodiment is discussed in more detail below.

A cumulative playback time permission allows playback of any part of a file as many time as wanted up to a maximum cumulative time specified by the permissions This type of permission is typically used and implemented in devices having integrated DRM and playback systems, so the playback system can inform the DRM system of the amount of time that the playback system played the file. However, in this embodiment, the playback system 160 for the file 130 is located in the second device 150, and the DRM system 120 in the first device 100 streams the file 130 to the second device 150 for playback. As used herein, "steaming" refers to the technique of transferring data of a file in a relatively continuous flow to allow a receiving device (such as the second device 150) to (render and) play data of the file as it is being received rather than waiting for the entire file to be transferred. Although the DRM system 120 on the first device 100 can determine the amount of data of the file 130 streamed to the second device 150 for playback, the DRM system 120 does not know how that amount of data relates to playback time (e.g., whether 100 bytes of the file 130 represent one second of played content or one minute of played content). Although the playback system 160 in the second device 150 can report the playback time to the DRM system 120, the DRM system 120 lacks the information to determine playback time and may not want to rely upon such information provided by second device 150, as there is a risk that a hacker can cause the playback system 160 to report a false playback time as a way of circumventing the cumulative playback time permission 140.

To address the configuration where the DRM system is separated from the rendering device and where the permissions are related to playback time, time rate information is used to get playback time information from the bit being read by the rendering device. This bit could be read as part of an LBA read. The time rate can be obtained by the DRM system as part of the file meta data (from the file or associated with it) or received as part of a rights object. It can also be obtained after the file has played once. As used herein, "time rate" refers to the information needed to estimate a playback time of a file when an amount of data of the file streamed to another device for playback is known. For example, the time rate 145 can specify how many bits (or bytes) of streamed data are used to playback one second (or other time unit) of the file 130. Since the DRM system 120 of the first device 100 can determine the amount of data of the file 130 streamed to the second device 150, it can use that information along with the time rate 145 to estimate the playback time of the file 130 by the second device 150. For example, the amount (e.g., the number of bits or bytes) of streamed data of the file 130 multiplied by the time rate can provide the estimated playback time. (As will be described in more detail below, the estimated playback time may be the same as or different from the actual playback time.) In one embodiment, the first device 100 stores a time rate 145 associated with the file 130. The DRM system 120 can then accrue the estimated playback time against the allowed cumulative playback time in the permission 140. It should be noted that the foregoing acts can be performed in any order. For example, the estimating and accruing acts can be performed before—instead of after—parts of the file are streamed to the second device 150 to ensure that the permission will be updated even if a power loss or other event occurs after the file is played. Also, in an alternate embodiment, the time rate is acquired during the first play of a file, available for example on a time-shifting system such as personal video recorder environments.

Since the time rate 145 allows the DRM system 120 to determine an estimated playback time, these embodiments allow a cumulative playback time permission to be implemented on a device that has an on-board DRM system and is separated from the rendering system (such as a secure memory card), instead of merely on devices that have integrated DRM and playback systems. It should be noted that the estimated playback time generated using the time rate 145 can be used for purposes in addition to or instead of accrual against the allowed cumulative playback time in the permission 140. For example, estimated playback time of a particular file may be tracked for marketing or other purposes, in which case the estimated playback time does not have to be used as a limitation on playback but instead as a way to determine, for example, what file is played the most or simply to determine what file has played.

Calculating the Time Rate

The time rate 145 can take any suitable form and can be generated in any suitable manner that ties the read data with playback time information. For example, in one embodiment, the time rate is based on the average bit rate of the file. As used herein, the term "bit rate" refers to the number of bits of data of the file needed to be streamed from the first device to play back one unit of time of the file on the second device. Average bit rate is convenient information to use for the time rate since its reverse value provides a time-per-byte relationship. One of the limitations of using bit rate is that some files have variable bit rates (e.g., when different frames of a video file have different bit rates). However, for DRM reasons, it may be preferred not to allow an external device to access the entire (or part of the) file to calculate average bit rate. Another limitation is that some files have more data than just content (e.g., meta-data and other frame artifacts), and it could be difficult to read only the content (as its boundary may not match with LBA). Accordingly, a time rate that is based on bit rate may result in reaching the allowed cumulative playback time limit before the entire content of the file is rendered (since the streaming of the artifact bits would be accrued against the allowed cumulative playback time even though those bits do not result in rendered content) thus ending up with a bad user experience. To address this issue, the time rate can be the average bit rate of the file adjusted to account for non-content data (e.g., file format artifacts, comments, etc.) in the file in order to provide a good enough estimate of the playback time. For example, an extra margin could be added (e.g., an extra number of bytes or a percentage margin) to the average bit rate to ensure that the entire file can be played without the DRM system 120 prematurely shutting-down playback. It is noteworthy that some systems could specifically count the content only, and, thus, the average bit rate would provide a time rate that allows to compute the exact playback time.

In another embodiment, time rate takes the form of a ratio of the total playback time length (duration) of the file (e.g., three minutes and twenty-five seconds) and the size of the file (e.g., 3 MB), which also provides a bytes-per-unit-time relationship that can be used for a good enough estimate of the playback time. Since the size of the file can include non-content data artifacts, this relationship ensures that the entire file can be played without the DRM system 120 prematurely shutting-down playback. While this extra margin also means that the file can be played longer than the allowed cumulative playback time, the "extra" playback time allowed by this overestimation should not be significant. However, there may be situations where it is difficult or impossible to obtain duration information, such as with a live radio stream. In such situations, basing the time rate on an average bit rate may be preferred.

Getting the Needed Information to Calculate Time Rate

Because of the nature of DRM and other security or access control systems, the meta data needed to calculate the time rate might be protected. For example, the entire file could be ciphered, thus getting information such as bit rate or duration might be impossible. In one embodiment, when the time rate is not provided, for example, with the rights object (RO) or the meta data associated with the file (for example, during its acquisition), the DRM system 120 can authorize a temporary access in order to get the needed data to calculate the time rate. That access could then be counted (or not) toward cumulative time. In case of a time-shifting device such as personal video recorder (PVR), the information needed for the time rate can also be extracted during recording or the first time the recording is being watched.

Figure 2:
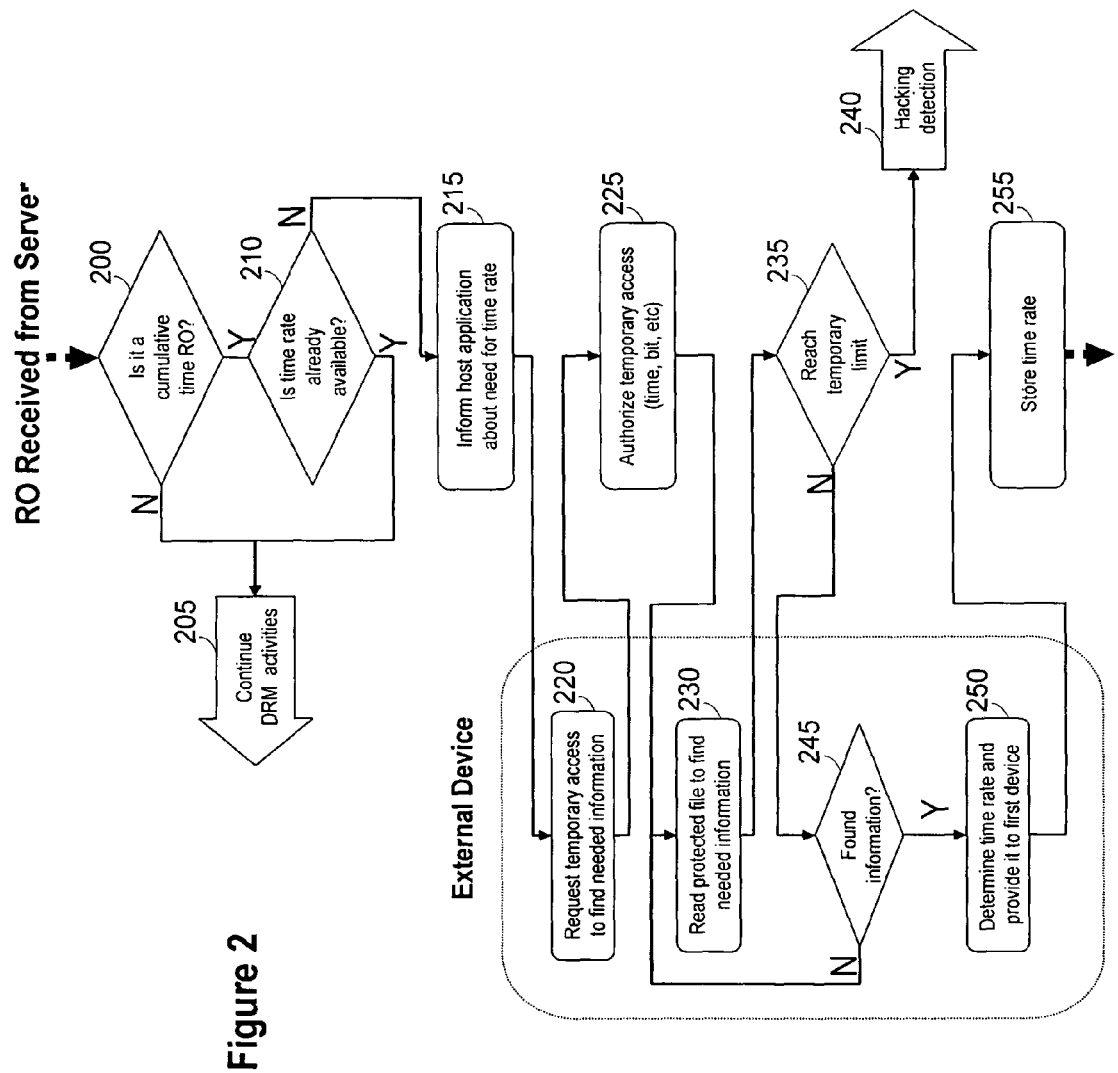
FIG. 2 is a flow chart of a method of an embodiment for acquiring time rate.

A license or RO is received for playback as required by the DRM system 120. If the licensing right includes time permissions such as, but limited to, a cumulative time permission, then time rate would be needed. Turning again to the drawings, FIG. 2 is flowchart of a method of an embodiment for getting the needed data to calculate the time rate associated with a protected file. In one embodiment, the first device 100 (e.g., the DRM system 120) can provide some information after the RO is received that specifies that time rate information is needed. The time rate information may have already been provided during a previous operation. If needed the time rate information can also be requested at time of playback. As shown in FIG. 2, in this embodiment, the RO is received by the first device 100 from a server. When the first device 100 receives the RO, the DRM system 120 determines if the RO for the file 130 is a cumulative time RO (i.e., is there a cumulative playback time permission associated with the file) (act 200). If the RO is not a cumulative time RO, the DRM system 120 continues with DRM activities (act 205). However, if the RO is a cumulative time RO, the DRM system 120 determines if the time rate needed to handle the cumulative time RO is already available (act 210). If the time rate is already available, the DRM system 120 continues with DRM activities (act 205).

If the time rate is not already available, the DRM system 120 informs a host application on an external device about its need for the time rate (act 215). This is also the case at time of playback when the time rate is needed (the time rate would not be needed, for example, when the time rate is already stored in the first device 100 or, in some embodiments, when the file 130 is being accessed for the first time (e.g., in a "free first play" situation)). (In this embodiment, the first device 100 does not manage the file system where the files are stored (such as when the files are stored in a memory other than memory 110) and needs to rely upon the external device to find the needed information.) In some embodiments, the time rate is needed before content can play but, in other embodiments, the time rate could be provided after playback has started and the conversion to cumulative time can be done at that time. In the most common case where the time rate is require before playback, the host application on the external device then sends a request to the DRM system 120 for temporary access to the file to find the information needed to generate the time rate (act 220). This information can be, for example, a bit rate of the file or the total playback time length of the file and the size of the file. In response to this request, the DRM system 120 authorizes temporary access, which can come in the form of a limited number of bits or a limited amount of time for streaming the file, for example (act 225). Preferably, the amount of temporary access that is given is enough for the external device to find the needed information but not enough to play the entire file and thereby circumvent the cumulative time permission. For example, for a song file, the temporary access can authorize access to 10-50 KB of the file, and, for a movie file, the access can be authorized for 100-500 KB. In general, the temporary access is preferably enough to cover the targeted content format that will be supported. The content format that supports unlimited header size may have to be set properly by the content delivery server in order to comply.

The external device then searches through the file to find the needed information by streaming data of the file from the first device 100 (act 230). Once the needed information is found, the external device can provide the time rate information to the DRM system.

While the external device is reading the file, the DRM system 120 regularly checks to see if the limit specified by the temporary access has been reached (act 235). This could be done by checking over the temporary access according to a number of LBAs or a number of bytes. If stream requests are still coming in once the limit has been reached, the DRM system 120 detects that a possible hacking operation is taking place (act 240), and the stream is stopped. As long as the limit has not been reached and the external device has not yet found the information it needs (act 245), the external device continues to read the file (act 230). When the external device finds the information it needs, it determines the time rate and provides it to the first device (act 250). For example, if the time rate comprises the average bit rate, the external device can calculate the time rate and can also adjust it to account for non-content data in the file (e.g., by adding a margin percentage to the time rate). (No adjustment may be needed if a special command is used to read the content part of the file without the file format artifacts or other non-content parts of the file.) As another example, the external device can calculate a ratio of a total playback time length of the file and a size of the file. After the DRM system 120 receives the time rate from the external device, it stores the time rate in the memory 110 of the first device 100 (act 255). In some embodiments, the DRM system 120 can trust the time rate received from the external device since the application in the external device is preferably authenticated to the first device 100 as a trusted entity as part of the RO acquisition process. Since various files may have different time rates, each time rate stored in the memory 110 is associated in some matter with its respective file. For example, in one embodiment, the time rate is added to the RO or stored in a separate section that relates to the cipher key. In another embodiment, the time rate is stored in an index such as the content ID used by the underlying DRM system to request a RO, since a given file can have multiple ROs. In that embodiment, the content cipher key can be associated with that same index as well as the time rate. For example, to speed up operations, an index file that lists the RO for a given file can also contain the CEK and the time rate. So, when the DRM system 120 obtains the key and accesses the index, the DRM system 120 would know whether or not it has the time rate information.

It should be noted that FIG. 2 shows various acts (acts 220, 230, 245, and 250) being performed by an "external device." The external device can be a device that has a playback system for rendering the file (render the file) (such as the second device 150 in FIG. 1) or can be another device. For example, if the first device 100 takes the form of a memory card, and the second device 150 takes the form of a mobile phone, the external device can be a personal computer connected to the mobile phone or a device in communication with the mobile phone (or the personal computer) via a network. As another example, the memory card can be connected to the personal computer via a card reader, in which case, the mobile phone may be used for playback of the file but not necessarily for acquiring the time rate. Of course, these are merely examples, and other configurations can be used. For example, as noted above the first device 100 can be indirectly connected to the second device 150, such as when a memory device is indirectly connected to a TV or PC via a portable media player (PMP). It should also be noted that the process of acquiring the time rate can be separate from acquisition of the RO. Accordingly, the time rate acquisition process can begin at act 220 instead of act 200 in FIG. 2.

Using Time Rate for Cumulative Time

Figure 3:
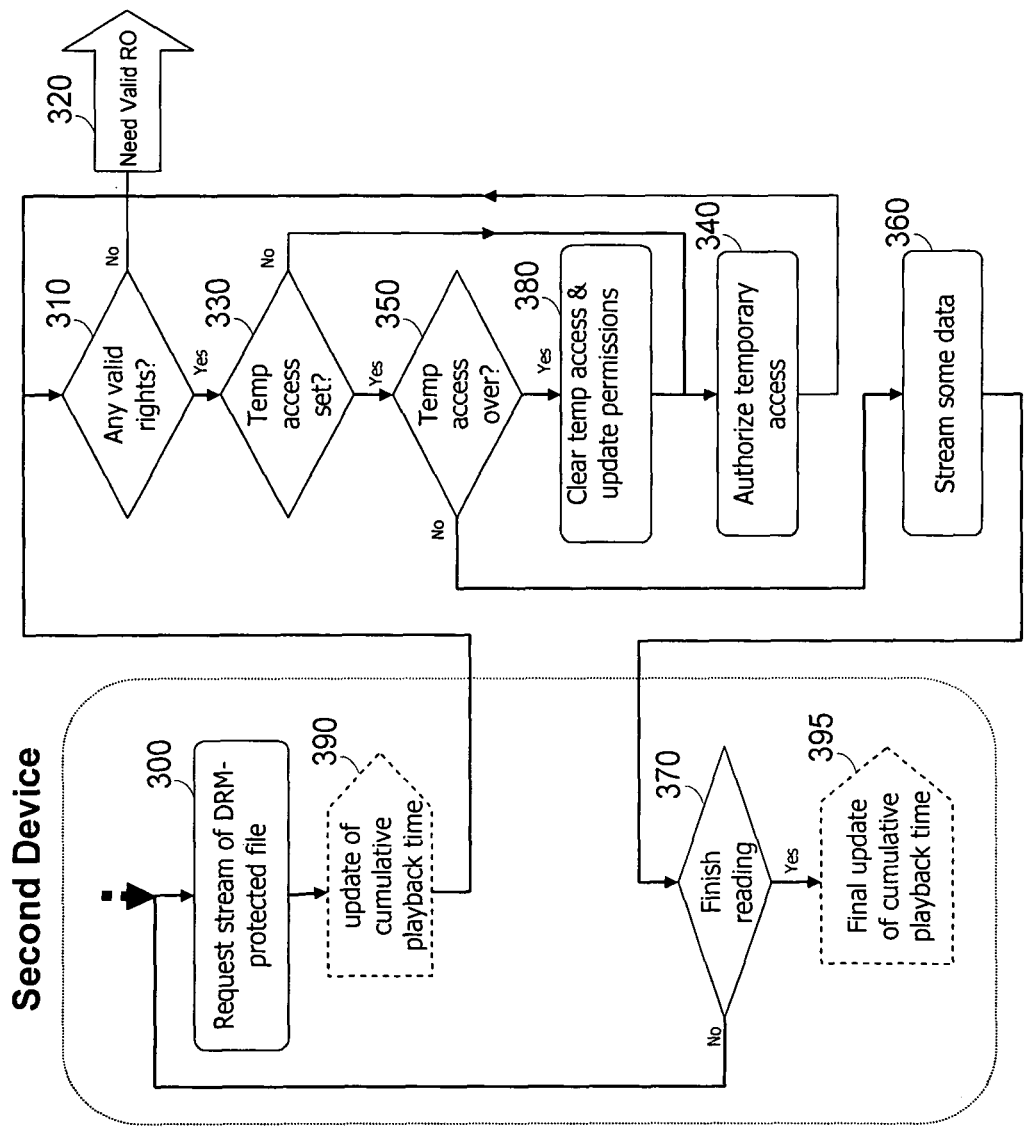
FIG. 3 is a flow chart of a method of an embodiment for playing back a file.

Turning again to the drawings, FIG. 3 is a flow chart of a method of an embodiment for playing back a file. As shown in FIG. 3, the second device 150 requests a stream of the DRM-protected file from the first device 100 (act 300). The DRM system 120 on the first device 100 then determines if there are any valid rights (act 310). If there are no valid rights, the DRM system 120 will need to obtain a valid rights object (RO), and the method shown in FIG. 2 is performed (act 320). If there are valid rights but time rate is missing and needed, the DRM system 120 determines if temporary access to the file has already been set (act 330). If temporary access to the file has not already been set, the DRM system 120 will authorize temporary access (e.g., 512 bytes of data of the file) (act 340). Acts 310 and 330 are then repeated, but, this time, the DRM system 120 determines that temporary access has been set at act 330, and the DRM system 120 then determines if the temporary access is over (act 350). If the temporary access is not over, the DRM system 130 will stream requested data of the file to the second device 150 for playback (act 360). The second device 150 plays the streamed data and determines if it is finished reading the file (act 370). If the second device 150 is not finished, it requests another group of data to stream of the file (act 300), and the DRM system 120 repeats the acts described above (act 340). However, when the DRM system 120 eventually determines that the temporary access is over, the DRM system 120 will clear the temporary access (act 380) and update status. In some embodiments, the access will be suspended until the time rate is provided. In some other embodiments, the DRM system 120 will keep tracking cumulative number of bytes read in order to update the cumulative time permission once the time rate is received (act 380). In some other embodiments, the temporary access could be counted over cumulative time, and, in some others, it may not. Any other relevant permissions can be updated at this time as well.

If the time rate is already available, the DRM system will grant each request as long as the permissions remain valid. The process remains the same as during temporary access to search for information needed for the time rate except that each access is counted over cumulative time. Also, while FIG. 3 was explained in the context of the second device 150 playing a file, the method shown in FIG. 3 can also be used for the time rate acquisition process in embodiments where the temporary access to determine the time rate is accrued against the allowed cumulative playback time.

Figure 6:
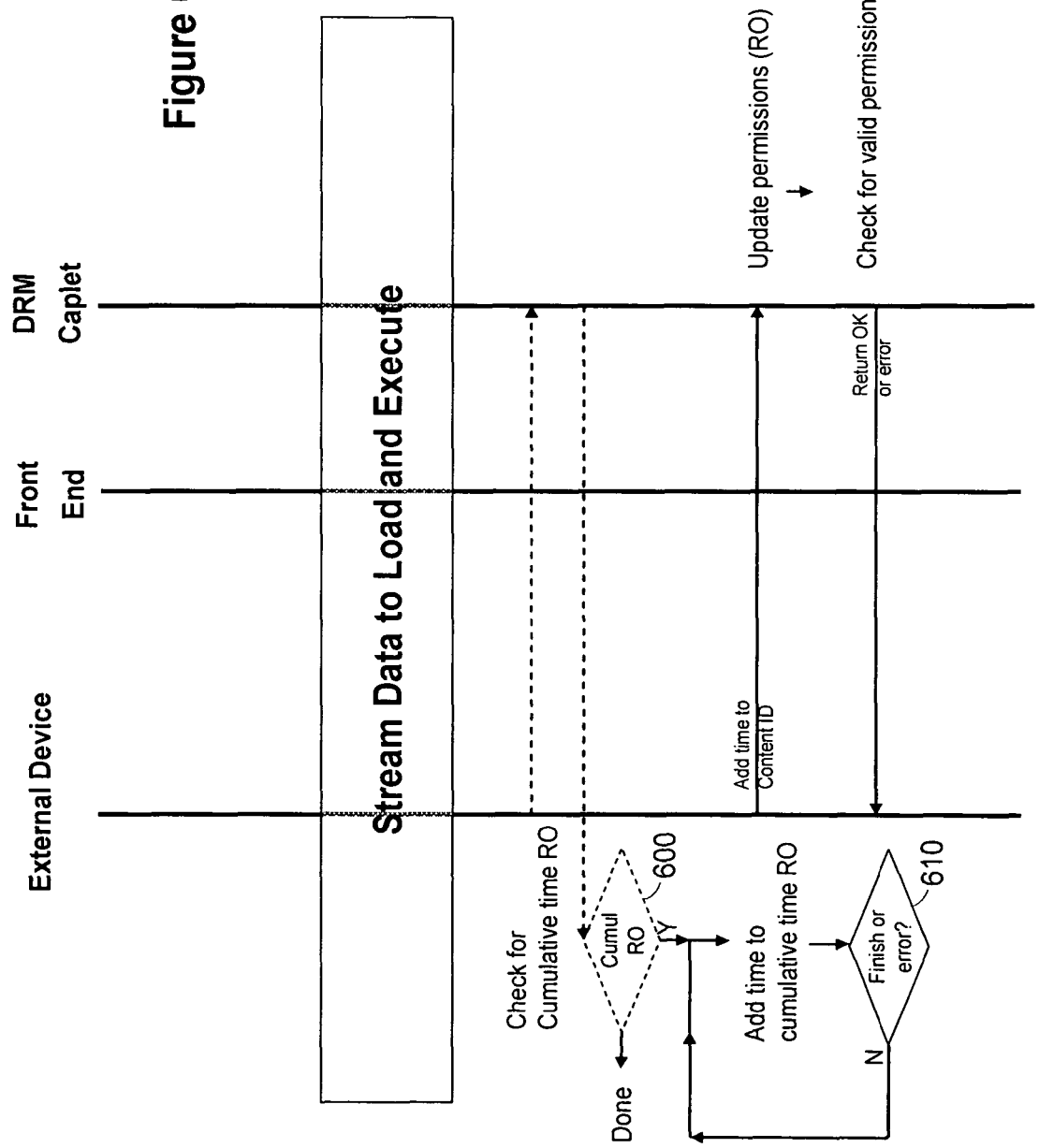
FIG. 6 is a flow diagram of an embodiment illustrating load and execute operations.

It should be noted that, for files where the data stream and playback time are not necessarily related (such as with games), relying only upon the time rate and amount of streamed data may not provide an accurate estimate of "playback" time. To address this situation, the second device 150 can regularly send updates of playback time (for the DRM system to update cumulative time) that occurs outside of the steaming process when the second device 150 request a stream of the file (act 390) and/or when the second device 150 is finished reading the file (act 395). (FIG. 6 shows these operations in more detail for a presently preferred embodiment.) In that case, the device 100 will be the last barrier that ensures that access will not be unlimited.

Figure 4:
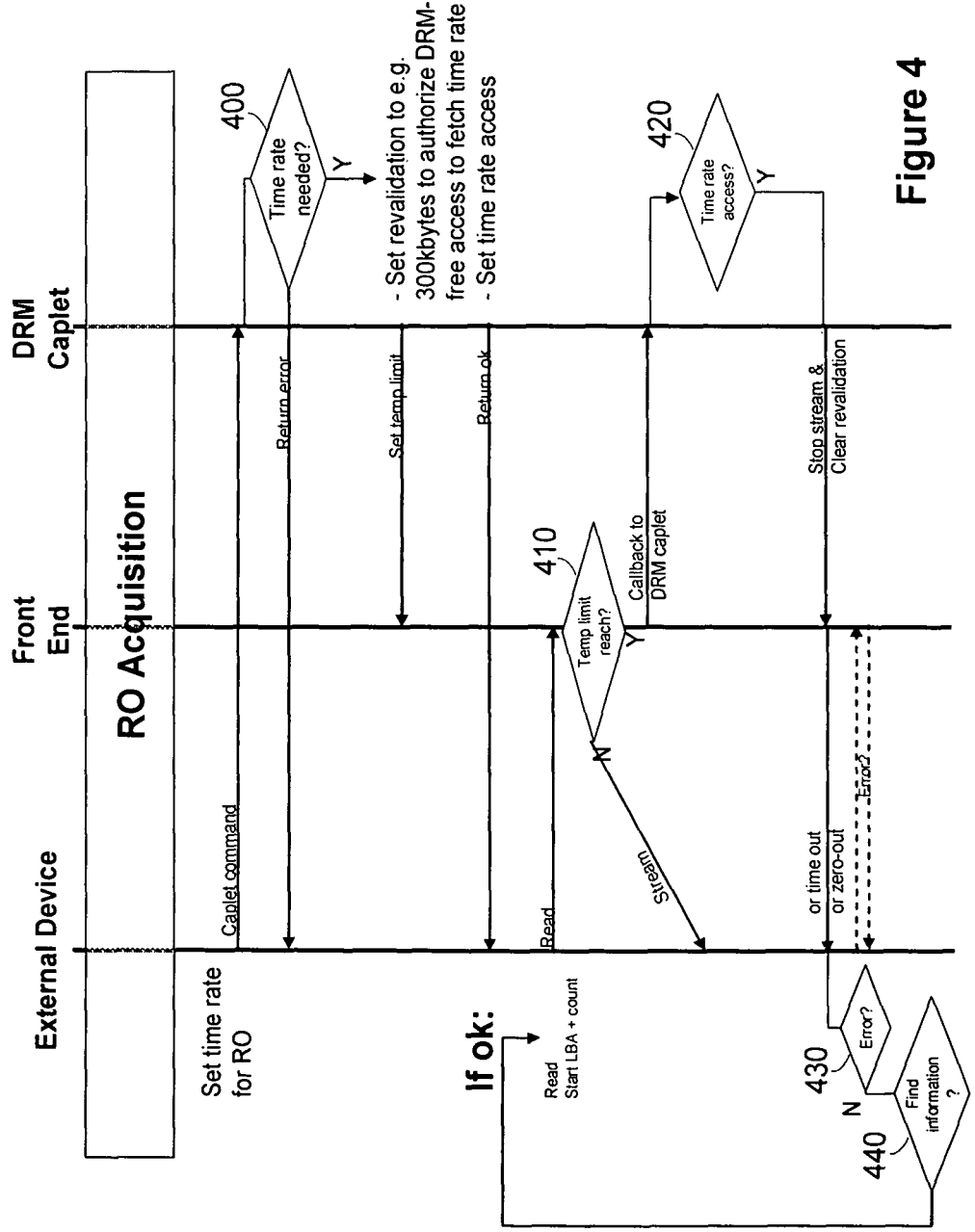
FIG. 4 is a flow diagram of an embodiment for setting up a time rate.
Figure 5:
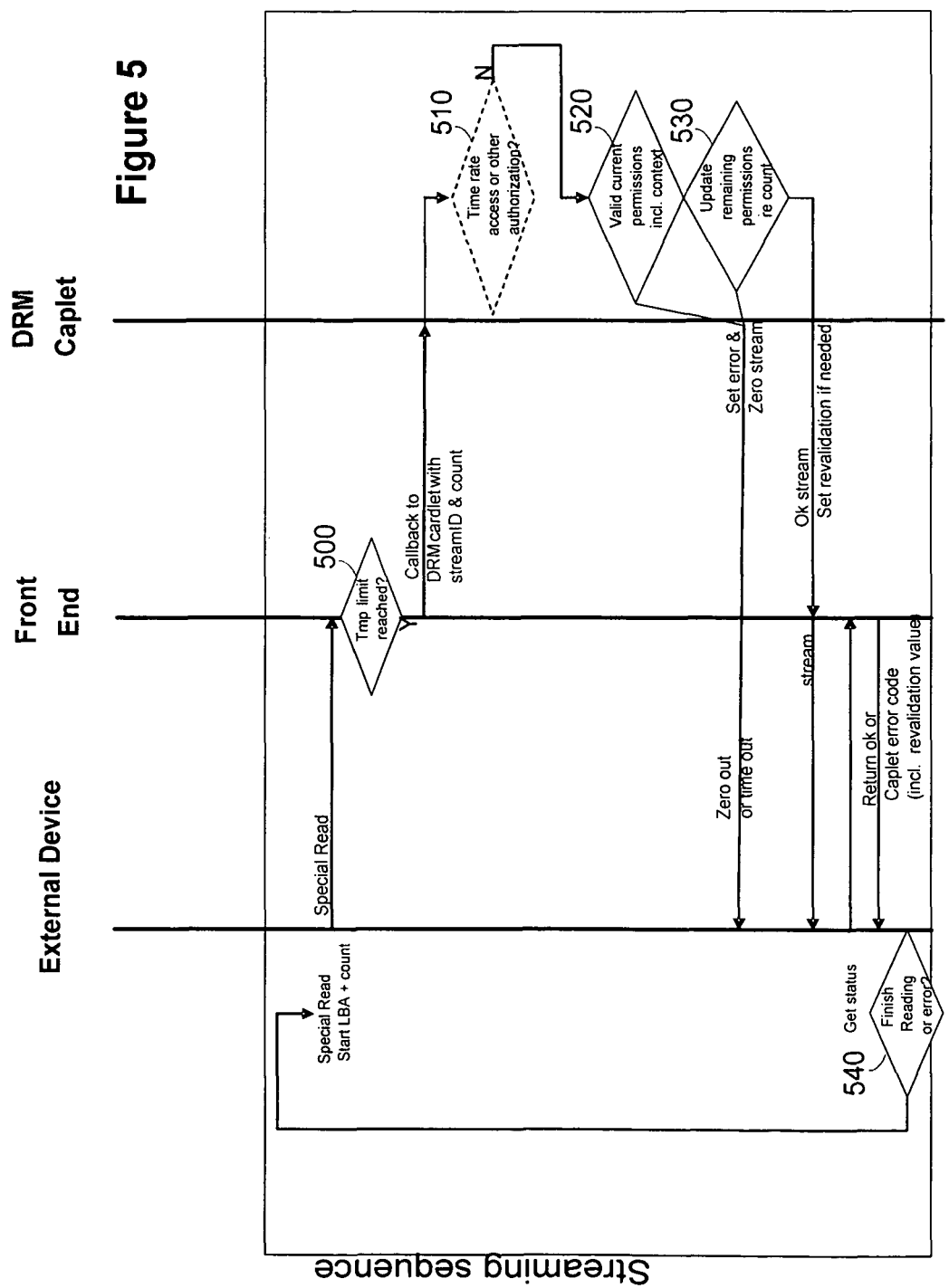
FIG. 5 is a flow diagram of an embodiment illustrating a continuous read data stream.

With the general operation of the embodiments being described, the following paragraphs and FIGS. 4-6 will be used to illustrate the operation of a presently preferred embodiment. It should be noted that the details discussed herein are for illustration purposes only and should not be read into the claims unless expressly recited therein. Further, as mentioned above, alternatives to these embodiments can be used.

Returning to the drawings, FIG. 4 is a flow diagram of an embodiment for setting up a time rate after a rights object (RO) acquisition process. In this process, an external device sets a time rate for a RO/content object (CO) (the time rate relates to content—not its rights, which drives the need for it) by sending a caplet command to a DRM caplet (i.e., card applet) in the DRM system 120. The DRM caplet determines if the time rate is needed (act 400), and, if it is not, returns an error. If the DRM caplet determines that time rate is needed (act 400), the DRM caplet sets the revalidation to 300 kb, for example, to authorize access to the file to fetch the time rate information. The DRM caplet then sets the temporary limit in the front end of the DRM system 120 and returns an ok message to the external device. When the ok message is received by the external device, it sends a read command to the front end of the DRM system 120, which determines if the temporary limit has been reached (act 410). If the temporary limit has not been reached, the DRM system 120 will stream data from the file to the external device. However, if the temporary limit has been reached, the front end will issue a callback to the DRM caplet (revalidation), which determines if a time rate access operation is taking place (act 420) (to distinguish from regular access that is counted over cumulative time). The DRM caplet then stops the stream and clears the revalidation, which causes the front end to send a time-out or zero-out message to the external device. Unless the external device detects an error (act 430), it will determine if the needed information is found and, if so, will start a read operation. In some embodiments, step 410 could keep track of temporary access even after the first device 100 is turned off. In some other embodiments where step 410 does not keep track of cumulative access, step 410 can be set to regularly generate a revalidation call back and have step 420 update cumulative access as it would for normal DRM operation. This particular process is also described in more details in FIG. 5.

FIG. 5 is a flow diagram of an embodiment illustrating a continuous read data stream. In this embodiment, the external device sends a special read command to the front end of the DRM system 120, which determines if the temporary limit has been reached (act 500). If the temporary limit has been reached, the front end places a callback to the DRM cardlet with a streamID and a count. The DRM caplet can optionally determine whether there is a time rate access or other authorization (act 510). The DRM caplet then determines if there are valid current permissions (act 520) and whether there are updates remaining to the permissions (act 530). During the process, a partial stream can be authorized. Various messages are passed between the components, and the external device eventually determines whether it is finished reading or if an error occurred (act 540).

FIG. 6 is a flow diagram of an embodiment illustrating load and execute operations. This is relevant to games where data steam may not be directly related to playback time. As shown in FIG. 6, the external device optionally checks for a cumulative time RO (act 600) and, accordingly, sends a playback time update for the DRM caplet to add the time to the cumulative time. The external device checks for an error (act 610) to determine if the limit has been reached.

It is intended that the foregoing detailed description be understood as an illustration of selected forms that the embodiments can take and does not intend to limit the claims that follow. Also, some of the following claims may state that a component is operative to perform a certain function or configured for a certain task. It should be noted that these are not restrictive limitations. It should also be noted that the acts recited in the claims can be performed in any order—not necessarily in the order in which they are recited. Additionally, any aspect of any of the preferred embodiments described herein can be used alone or in combination with one another.

What is claimed is:

1. A method for handling a cumulative playback time permission, the method comprising:
   streaming a file from a first device to a second device for a playback of the file, wherein the file is associated with a permission specifying an allowed cumulative playback time of the file;
   during the streaming of the file, periodically determining, by the first device, an amount of data of the file that was streamed to the second device;
   upon at least one determination of the amount of data of the file that was streamed to the second device, estimating, by the first device, a playback time of the file using a time rate associated with the file and the determined amount of data of the file that was streamed to the second device;
   determining, by the first device, that the estimated playback time equals the allowed cumulative playback time; and
   in response to determining that the estimated playback time equals the allowed cumulative playback time, preventing, by the first device, a remaining amount of data of the file to be streamed to the second device.

2. The method of claim 1, wherein the time rate comprises an average bit rate of the file.

3. The method of claim 1, wherein the time rate comprises an average bit rate of the file adjusted to account for non-content data in the file.

4. The method of claim 1, wherein the time rate comprises a ratio of a total playback time length of the file and a size of the file.

5. The method of claim 1 further comprising receiving the time rate from a third device in communication with the first device.

6. The method of claim 5 further comprising providing the third device with temporary access to the file to determine the time rate.

7. The method of claim 1, wherein the file is streamed by repeatedly determining if the cumulative playback time permission is still valid and, if the cumulative playback time permission is still valid, allowing the second device temporary access to the file.

8. The method of claim 1, wherein the file is a digital rights management (DRM)-protected file, and wherein a DRM system in the first device performs the streaming, determining, and estimating.

9. The method of claim 1, wherein the first device comprises a memory device and the second device comprises a host device.

10. The method of claim 1, wherein the first device comprises a personal computer and the second device comprises a network device.

11. The method of claim 1, wherein the file is stored in the first device.

12. The method of claim 1, wherein the file is stored in a device external to the first device.

13. The method of claim 1, wherein the time rate is provided to the first device as part of a rights object associated with the file.

14. A method for handling a cumulative playback time permission on a memory device, the method comprising:
    streaming a digital rights management (DRM)-protected file from a memory device to a host device for playback, wherein the file is associated with a permission specifying an allowed cumulative playback time of the file;
    during the streaming of the file, periodically determining, by a DRM system in the memory device, an amount of data of the file that was streamed to the host device;
    upon at least one determination of the amount of data of the file that was streamed to the host device, estimating, by the DRM system in the memory device, a playback time of the file using a time rate associated with the file and the determined amount of data of the file that was streamed to the host device;
    determining, by the DRM system in the memory device, that the estimated playback time equals the allowed cumulative playback time; and
    in response to determining that the estimated playback time equals the allowed cumulative playback time, preventing, by the DRM system in the memory device, a remaining amount of data of the file to be streamed to the host device.

15. The method of claim 14, wherein the time rate comprises an average bit rate of the file.

16. The method of claim 14, wherein the time rate comprises an average bit rate of the file adjusted to account for non-content data in the file.

17. The method of claim 14, wherein the time rate comprises a ratio of a total playback time length of the file and a size of the file.

18. The method of claim 14 further comprising receiving the time rate from a third device in communication with the memory device.

19. The method of claim 18 further comprising providing the third device with temporary access to the file to determine the time rate.

20. The method of claim 14, wherein the file is streamed by repeatedly determining if the cumulative playback time permission is still valid and, if the cumulative playback time permission is still valid, allowing the host device temporary access to the file.

21. The method of claim 14, wherein the file is stored in the memory device.

22. The method of claim 14, wherein the file is stored in a device external to the memory device.

23. The method of claim 14, wherein the time rate is provided to the memory device as part of a rights object associated with the file.

24. A method for estimating playback time of a file, the method comprising:
    performing the following by a first device:
      streaming a file from the first device to a second device for playback, wherein the file is associated with a permission specifying an allowed cumulative playback time of the file;
      during the streaming of the file, periodically determining an amount of data of the file that was streamed to the second device;
      upon at least one determination of the amount of data of the file that was streamed to the second device, estimating a playback time of the file using a time rate associated with the file and the determined amount of data of the file that was streamed to the second device;
      determining that the estimated playback time equals the allowed cumulative playback time; and in response to determining that the estimated playback time equals the allowed cumulative playback time, preventing a remaining amount of data of the file to be streamed to the second device.

25. The method of claim 24, wherein the time rate comprises an average bit rate of the file.

26. The method of claim 24, wherein the time rate comprises an average bit rate of the file adjusted to account for non-content data in the file.

27. The method of claim 24, wherein the time rate comprises a ratio of a total playback time length of the file and a size of the file.

28. The method of claim 24, wherein the file is a digital rights management (DRM)-protected file, and wherein a DRM system in the first device performs streaming, determining, and estimating.

29. The method of claim 24, wherein the first device comprises a memory device and the second device comprises a host device.

30. The method of claim 24, wherein the first device comprises a personal computer and the second device comprises a network device.

31. The method of claim 24, wherein the file is stored in the first device.

32. The method of claim 24, wherein the file is stored in a device external to the first device.

33. The method of claim 24, wherein the time rate is provided to the first device as part of a rights object associated with the file.

* * * * *